US 11,225,979 B2

(12) United States Patent
Basha et al.

(10) Patent No.: US 11,225,979 B2
(45) Date of Patent: Jan. 18, 2022

(54) MULTIPHASE FLOW LOOP FOR PUMP PERFORMANCE EVALUATION

(71) Applicant: King Fahd University of Petroleum and Minerals, Dhahran (SA)

(72) Inventors: Mehaboob Basha, Dhahran (SA); Syed M. Shaahid, Dhahran (SA); Luai M. Alhems, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 160 days.

(21) Appl. No.: 16/803,367

(22) Filed: Feb. 27, 2020

(65) Prior Publication Data

US 2021/0270274 A1  Sep. 2, 2021

(51) Int. Cl.
  *F04D 31/00* (2006.01)
  *F04D 15/00* (2006.01)
  *F16K 11/10* (2006.01)
  *F16K 31/06* (2006.01)

(52) U.S. Cl.
  CPC ......... *F04D 31/00* (2013.01); *F04D 15/0005* (2013.01); *F04D 15/0088* (2013.01); *F16K 11/105* (2013.01); *F16K 31/0603* (2013.01)

(58) Field of Classification Search
  CPC .. F04D 31/00; F04D 15/0088; F04D 31/0005; F16K 11/105; F16K 31/0603
  See application file for complete search history.

(56) References Cited

U.S. PATENT DOCUMENTS

| 7,334,780 B2 | 2/2008 | Sakakibara et al. |
| 2005/0229716 A1 | 10/2005 | Unsworth et al. |
| 2015/0267626 A1 | 9/2015 | Lund |
| 2016/0184739 A1* | 6/2016 | Bibet ...................... F04B 13/02 96/156 |
| 2017/0131026 A1* | 5/2017 | Imamkhan .............. F25B 40/04 |
| 2017/0284853 A1* | 10/2017 | Ahmad ............... G01F 25/0038 |

FOREIGN PATENT DOCUMENTS

CN          107013458 B     7/2019

* cited by examiner

*Primary Examiner* — Charles G Freay
(74) *Attorney, Agent, or Firm* — Oblon, McClelland, Maier & Neustadt, L.L.P.

(57) ABSTRACT

The operational performance of pumps can be improved when pumping liquids with at least 10 vol. % gas volume fraction (GVF) as found in many oil fields, wherein wells produce mixtures of gas and oil in varying proportions. An increase in the GVF that would have led to slugging in the flow, degrading the performance of pump in multiphase flow loop, and would have necessitated a check valve at each fluid stream to avoid flow reversal, can be overcome by a multiphase flow loop including a solenoid valve on the gas stream, which maintains the same intake gas pressure as that of oil/liquid pressure during the experiments. By testing pumps at more accurate GVFs, pump performance can be better assessed, resulting in reduced power consumption and increased efficiency.

13 Claims, 3 Drawing Sheets

MULTIPHASE FLOW LOOP FOR PUMP PERFORMANCE EVALUATION

STATEMENT OF ACKNOWLEDGEMENT

The inventors gratefully acknowledge the Center for Engineering Research (CER) of the Research Institute at the King Fand University of Petroleum and Minerals, Dhahran, Saudi Arabia, for financially supporting this research.

BACKGROUND OF THE INVENTION

Field of the Invention

The present disclosure relates to multiphase oil-gas flow loops in piping systems in which pump performance can be measured, particularly exchanging one or more solenoid valves in place of one or more needle valves in a gas line of the multiphase oil-gas flow loop, in order to maintain substantially the same intake gas pressure as that of oil, i.e., liquid, pressure such that more accurate measurements of pump performance can be ascertained.

Description of the Related Art

Two-phase flow, such as oil-gas or water-gas, is the simplest case of multiphase flow in which two phases are present. Fluid flow in production lines of oil and/or gas wells is typically an example of multiphase flow. Oil-air or oil-gas two-phase flow in a pipeline often occurs in the petroleum industry. An important topic of petrochemical research includes the study of the behavior of such flows in order to characterize two-phase flow in upstream production pipelines. The transportation of gas-oil-water mixtures through pipelines is a common, even dominant, occurrence in the oil and gas industry. Two-phase flow is not limited to the oil and gas industry, but can also be encountered in chemical, nuclear, food, and other industries.

The arrangement of the piping and the valves used can play a significant role in characterizing the flow, content and composition properties of fluid streams. Certain valve arrangements are commonly used in the art to control and/or modify two-phase flow.

Gate valves, also known as sluice valves, are valves that open by lifting a barrier (gate) out of the path of the fluid, thus requiring little space along the pipe axis and allowing substantially unrestricted fluid flow when the gate is fully opened. Gate faces in the gate value can be parallel but are most commonly wedge-shaped to apply pressure on the sealing surface. Gate valves are primarily designed to start or stop a fluid flow when minimum flow restriction is needed. In service, gate valves are typically kept either fully open or fully closed. When turned open, the disc of the gate is completely removed or displaced, allowing contents to pass. Although the construction of the gate valve gives it good shut-off properties and is bidirectional, gate valves cannot be comparatively quickly opened or closed.

Globe valves, named for their spherical body shape with the two halves of the body being separated by an internal baffle, have a movable plug or disc element and a stationary ring seat in a generally spherical body. The spherical body in a globe valve has an opening that forms a seat into which a movable plug or disc can be screwed to close/shut the valve. The plug is typically connected to a stem operated by screw action using a handwheel in manual valves, while automated globe valves often use smooth, rather than threaded, stems and are opened and closed by an actuator assembly. Globe valves are conventionally used for isolation and throttling services as linear motion valves used to stop, start, and regulate flow, generally in T, Y, and other angle pipes. Globe valves have the disadvantage of unfavorable performance with high pressure drops.

Ball valves are quarter-turn valves that use a hollow, perforated, and pivoting ball to control flow. Ball valves are open when the ball's hole is in line with the flow and closed when it is pivoted 90-degrees by the valve handle. The handle typically lies flat in alignment with the flow when open, and perpendicular when closed, facilitating visual confirmation of the valve status. Ball valves are durable and reliable, closing securely even after long periods of disuse and multiple cycles, making them favored for shutoff and control applications, where ball valves are often preferred to gates and globe valves, they still lack fine control for throttling applications.

Needle valves include a small port and a threaded, needle-shaped plunger, allowing precise regulation of flow, although typically only enabling relatively low flow rates. Needle valves can accurately control flow rates of clean gasses or fluids, allowing gradual and smooth flow rate adjustments. However, in addition to the low flow rates manageable, needle valves have a relatively large pressure drop from the inlet to the outlet.

Solenoid valves have two main parts: the solenoid and the valve. The solenoid converts electrical energy into mechanical energy which, in turn, opens or closes the valve mechanically. A direct acting valve has only a small flow circuit, but a diaphragm piloted valve can multiply small pilot flow, using it to control the flow through a larger orifice. Solenoid valves may use a spring to hold the valve opened (normally open) or closed (normally closed) while the valve is not activated. Solenoid valves may be used wherever fluid flow has to be controlled automatically.

It is usually the case in a multiphase flow loop that each stream of fluid has a check valve to avoid flow reversal. During oil-gas experiments, gas can be introduced into the oil stream at higher pressure to attain a desired gas volume fraction (GVF) at the pump inlet. The check valve should open only when the gas pressure is higher than oil stream pressure, which can hinder ascertaining the true gas volume fraction (GVF). Such poor assessments can affect performance evaluation of pumps. Numerous arrangements of these various valve arrangements have been implemented in oil and/or gas pipeline systems, including in two-phase flow situations. For circuitous arrangements in which particular gas volume fractions (GVFs) are present in a two-phase flow through a pump, the measurement accuracy of the pump performance can be affected by the selection pressure distribution and valves. Without indicating this measurement accuracy problem or even recognizing that a problem exists, certain layouts in the art warrant discussion.

CN 107013458 B to Liu et al. (Liu) discloses a performance testing device and method for a screw pump. Liu's testing and detecting devices are used for single-phase or two-phase media simulating experiments and judge the performance of the screw pump and optimize a rotation speed of the screw pump. Liu's testing device and method research the performance of the screw rod pump under the conditions of different rotation speed, inlet and outlet pressure difference of the pump, viscosity of crude oil, mass parts of conveyed medium gas, etc. Liu's detection device comprises a sensor, a programmable logic controller (PLC), an upper computer and a variable frequency control cabinet. Liu's detection device is used for acquiring data of the screw pump. By adopting a relative error method of actual measurement rotation speed and optimized rotation speed, Liu judges the condition of the screw pump performance. Liu's device can be semi-automated, and can judge the screw pump performance condition, and adjust the screw pump rotation speed by negative feedback controlling, to improve operation state of the screw pump, and extend the pump service life. Liu does not appear to disclose an electronically-controlled solenoid valve placed in the gas system upstream of the gas introduction into the multiphase flow loop. Liu's flow loop contains a gamma-ray crude oil holdup analyzer. Moreover, Liu does not indicate that its gas pressure is equal to the pressure of the oil, nor does Liu describe two connection points to the loop from its gas line.

US 2005/0229716 A1 by Unsworth et al. (Unsworth) discloses a method of monitoring fluid flow in a closed conduit using a flowmeter associated with the conduit. Unsworth's method includes generating a signal indicative of characteristic(s) of fluid flow and measuring the signal components/fluctuations, and analyzing the component(s) of the sensed signal to determine the presence or absence of a second phase and/or to determine the magnitude of the phase(s). Unsworth's method measures characteristics of the two-phase fluid flow and determines, by comparison with characteristics of single-phase fluid flows of the individual phases of the two-phase fluid flow, the presence of a second phase or the amount of one of the phases. Unsworth does not use an electronically-controlled solenoid valve in the gas stream just upstream of the gas injection point into the two-phase flow, nor does Unsworth analyze the gas volume fraction in the two-phase flow. Unsworth does not describe the pressure of the gas introduced into the liquid flow as being equal to the pressure in the liquid flow.

US 2015/0267626 A1 by Lund (Lund) discloses a fuel enhancement system and method for supplying an engine with a pressurized homogenized mixture of a liquid fuel and a gaseous component. Lund's system may comprise a controller, a gaseous component flow control device, a homogenization system, and a gas processor. Lund's system may comprise a controller, a gaseous component flow control device, a device for generating signals indicative of liquid fuel flow, and a homogenization system. Lund describes generating signals indicative of liquid fuel flow. Lund discloses adjusting the amount of gas dispensed according to sensor signaling, e.g., if a specified characteristic of the mixture falls outside of limits, e.g., if the percentage of gas in the fuel mixture exceeds a predetermined level, but not evaluating the accuracy of the gas-liquid volume quantities. Lund lacks an electronically-controlled solenoid valve, a pressure regulator receiving signal from a liquid-only pressure gauge, and a gas system pressure gauge. Lund does not equalize its loop pressures or have two gas pipeline connections into a liquid or two-phase loop for testing gas fraction. Lund does not describe systems for measuring the properties of a pump while pumping multiphase flows of different gas volume fraction.

U.S. Pat. No. 7,334,780 to Sakakibara et al. (Sakakibara) discloses a method including pumping hot water in a bath up by a suction pump and into a $CO_2$ gas dissolver through one or more solution flow rate adjusters, then poured into the bath. The bubble quantity in the carbonated spring in a take-out pipe is measured, and the solution flow rate adjuster, gas flow rate adjuster, etc., are controlled by a controller, using a relationship between a target quantity of bubbles and $CO_2$ concentration to obtain a desired concentration of $CO_2$ gas in carbonated spring. Sakakibara's $CO_2$ gas flow controller between its $CO_2$ gas dissolver and $CO_2$ gas source allows high concentration carbonated spring to be produced even if the pressure of the $CO_2$ supplied changes or the permeating performance of a membrane changes. Sakakibara discloses solenoid valves for controlling the amount of gas flow into its gas dissolver, but Sakakibara's solenoid valves receive signals from flow sensors, not pressure sensors. Sakakibara's seeks to maintain a specified mass flow despite changes in the fluid system pressure, not equalize the pressures in a gas and fluid system. Sakakibara does not describe measuring pump properties of multiphase flows of different gas volume fractions.

In light of the above, a need remains for devices and piping systems capable of more accurate measurement of the performance of pumps, particularly for the implementation of one or more solenoid valves in place of one or more needle valves in particular locations in two-phase fluid loops containing one or more pumps, as well as methods of making and using such pipe systems and/or reducing unnecessary power consumption and/or increasing efficiency of the pumps at any given gas volume fraction (GVF).

SUMMARY OF THE INVENTION

Aspects of the invention provide pump testing systems comprising a flow loop comprising: a fluid tank comprising a liquid outlet and a fluid inlet; a first two-way valve fluidly connected to the liquid outlet; a liquid flow meter fluidly connected to the first two-way valve; a first one-way valve fluidly connected to the liquid flow meter; a first three-way connection comprising a first input branch fluidly connected to the first one-way valve, a second input branch fluidly connected to a gas system, and an output branch; a second two-way valve fluidly connected to the first three-way connection; a static mixer fluidly connected to the output branch of the first three-way connection through the second two-way valve; a test pump assembly fluidly connected to the static mixer; a third two-way valve fluidly connected to the test pump assembly; and a fluid return fluidly connected to the third two-way valve and the fluid inlet of the liquid tank, wherein the first two-way valve, second two-way valve, the input branches of the three-way connection, and the output branch of the first three-way connection are capable of stopping a flow through the flow loop, wherein a liquid-only pressure gauge is arranged on piping at a point between the fluid tank and the first three-way connection such that a liquid-only pressure is measured, wherein the static mixer is configured to mix a liquid flow from the liquid tank with a gas flow from the gas system to produce a multiphase flow, and wherein the gas system comprises a gas tank, fluidly connected to the first three-way connection, and a solenoid valve between the gas tank and the first three-way connection. Such systems may be modified by any permutation of the features described herein, particularly the following.

The gas system may connect fluidly to the flow loop at a first point, at a second three-way connection, and a second point. The first and second points may be fluidly separated on the flow loop by the first one-way valve. The gas system may connect fluidly to the flow loop at a first point, at a second three-way connection, and a second point, joining at the first three-way connection.

The gas system may further comprise: a fourth two-way valve fluidly connected to the gas tank; a first pressure regulator fluidly connected to the fourth two-way valve; a gas flow meter fluidly connected to the pressure regulator; and a pressure gauge configured to measure a pressure in the gas system. The fourth two-way valve may be a gate valve. The solenoid valve may be arranged between, and in fluid connection with, the gas flow meter and the first three-way connection of the flow loop. The pressure regulator may be configured to receive a signal from the first pressure gauge and the pressure gauge of the gas system, and to equalize a pressure in the gas system and the flow loop, and operates the action of the solenoid valve. The gas system may comprise a second pressure gauge from which the pressure regulator is configured to receive a signal.

The flow loop and/or the gas system may be sealed off from the environment.

The first, second, and third two-way valves may independently be a gate valve, a globe valve, a ball valve, and/or a needle valve. The first, second, and third two-way valves may be gate valves.

In the gas system, the pressure regulator may be configured to branch off the gas flow in a first direction and a second direction, which fluidly connect at separate points onto the flow loop. The first direction may connect fluidly to the flow loop at a first point, at a second three-way connection, and/or the second direction may connect fluidly to the flow loop at a second point.

Inventive systems may be suitable for the liquid comprising at least 50 wt. % oil, based upon total liquid flow weight, and/or the gas comprising at least 50 wt. % air, based upon total gas flow weight. Inventive systems may be suitable for the liquid being oil and/or the gas being air.

The pump testing apparatus may be configured to adjust and maintain a gas volume fraction in the multiphase flow.

Aspects of the invention provide methods of testing pump performance, which methods may comprise: pumping a multiphase flow through the pump in the flow loop of any permutation of the inventive system described herein; and measuring the properties of the pump, wherein the multiphase flow comprises a liquid and a gas. Such methods may further comprise equalizing the pressure of the gas flow and the liquid flow within 95% using the solenoid valve.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
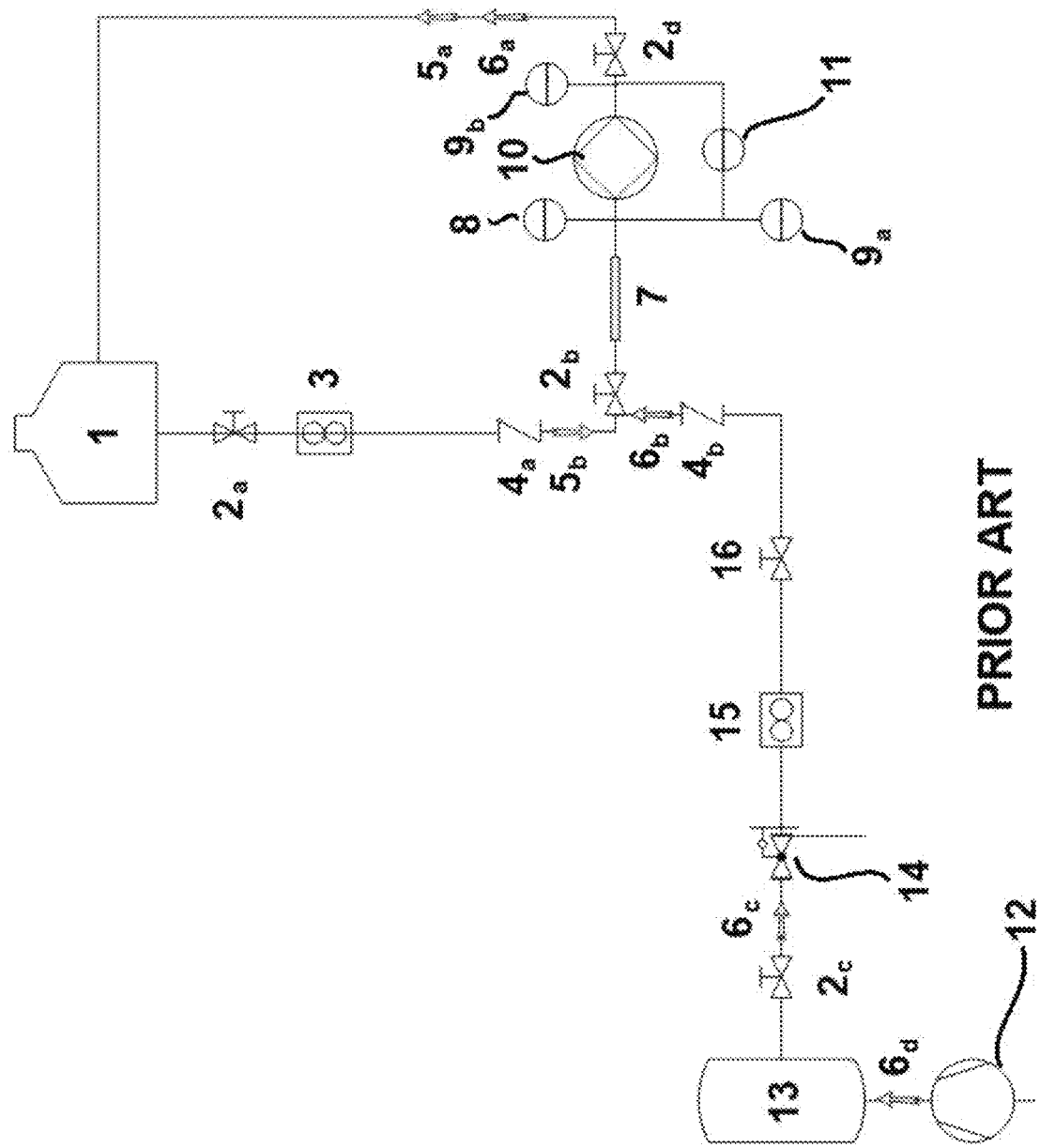
FIG. 1 shows an existing oil-gas multiphase flow loop arrangement.

Aspects of the invention provide pump testing systems comprising a flow loop and a gas system. The flow loop may comprise a fluid tank, such as an (crude, partially refined, or refined) oil, gasoline, solvent, LPG, LNG, refrigerant, liquid nitrogen, liquid helium, ethylene, propylene, acetylene, $CO_2$, water, or other typically closed container made of steel, iron, titanium, (impact) glass, or the like, which fluid tank comprises a fluid (liquid) outlet, typically substantially (at least 95, 96, 97, 97.5, 98, 99, 99.1, 99.5, 99.9 wt. % or more, based on total weight) liquid, and a fluid inlet suited for a two-phase mixture including a liquid and a gas in a volume ratio of, e.g., at least 0.1, 0.25, 0.33, 0.4, 0.5, 0.67, 0.75, 0.8, 0.9, 1, 1.1, 1.2, 1.5, 1.75, or 2:1 and/or up to 100, 90, 75, 67, 60, 50, 45, 40, 35, 30, 25, 20, 15, 10, 7.5, 5, 2.5, 1, or 0.9:1. The fluid inlet and/or fluid, preferably liquid, outlet may be independently integral with the fluid tank, e.g., cast integrally, welded, or otherwise, or the fluid inlet and/or liquid outlet may be detachably affixed to the fluid tank, e.g., by screw threads, by a twist clamp, by a snap-in joint, or the like. The piping involved in the entire loop may be (hermetically) sealed in operation, such that the fluid is not exposed to the environment. Accordingly, the loop may include steel (Inconel, alloyed—13xx, 40xx, 41xx, 43xx, 44xx, 46xx, 47xx, 48xx, 50xx, 50xxx, 50Bxx, 51xx, 51xxx, 51Bxx, 52xxx, 61xx, 86xx, 87xx, 88xx, 92xx, 94Bxx, ES-1, or the like, titanium, chrome-moly, carbon, ASTM A252 spec grade 1, grade 2, grade 3 steel pile pipe, stainless—austenitic, duplex, ferritic, martensitic, or precipitation-hardened, API 5L, or the like, as well as combinations), iron, copper, gunmetal, titanium, (impact or tempered) glass, nylon, epoxy, PVC, HDPE, PP-R, LDPE, etc., or combinations of these, including filled, composite, and lined (e.g., PTFE, nylon, glass) analogs of these.

The flow loop may comprise a first two-way valve fluidly connected to the liquid outlet (downstream thereof), e.g., via any of the aforementioned pipes, and may contain intervening components, such as any of the customary parts, joints, valves, vents, drains, flanges, special fittings, sampling lines, reducers, interlocks, swages, gauges described herein or otherwise known in the art. The two-way valve may be gate valve, a globe valve, a ball valve, a solenoid valve, a butterfly valve, a control valve, a diaphragm valve, or a needle valve, which may be manual or automatic (such as including a electric multi-turn or other actuator). Any valve, connection, or joint discussed herein may include a blast gate as technically appropriate. Additional components which may be present or absent, depending upon the end application, from inventive systems may include pressure vessels, columns, tanks, pumps, compressors, heat exchangers, furnaces, wellheads, fans, cooling towers, turbo-expanders, pig traps, bursting discs, restriction orifices, strainers, filters, steam traps, moisture traps, sight-glasses, silencers, flares, vents, flame arrestors, vortex breakers, eductors, or combinations of these. The two-way valve, like any other flow loop or gas system element described herein, may be integral with the upstream and/or downstream piping, e.g., cast integrally, welded, or otherwise, or fluid inlet and/or liquid outlet may be detachably affixed to the fluid tank, e.g., by screw threads, by a twist clamp, by a snap-in joint, or the like.

The flow loop may comprise a liquid flow meter fluidly connected to the first two-way valve (downstream thereof), e.g., via any of the aforementioned pipes, and may contain intervening components described herein. The flow meter may be an obstruction type meter (differential pressure or variable area), inferential meter (turbine type), electromagnetic meter, positive-displacement flow meter, fluid dynamic meter (vortex shedding), anemometer meter, ultrasonic meter, mass flow meter (coriolis force), etc., or may combine two or more of any of these technologies.

The flow loop may comprise a first one-way valve fluidly connected to the liquid flow meter, downstream of the flow meter and optionally further downstream of a three-way connection leading, e.g., through a pressure gauge to the gas system, such as through a pressure regulator. The first one-way valve may be fluidly connected to the liquid flow meter via any of the aforementioned pipes, and may contain any of the intervening components described above. The first one-way valve, i.e., check valve, clack valve, non-return valve, reflux valve, or retention valve, may be a ball check valve, a diaphragm check valve, a swing check valve, a tilting disc check valve, a reed valve, a stop-check valve, a lift-check valve, an in-line check valve, a duckbill valve, a pneumatic non-return valve, or some combination of these. The first one-way valve may be downstream of a three-way connection, which is fed by the gas system and the fuel tank, with an outlet to the first one-way valve.

The flow loop may comprise a first (further) three-way connection comprising a first input branch fluidly connected to the first one-way valve, a second input branch fluidly connected to a gas system, and an output branch. This first (further) three-way connection may include a connection to the gas system, which may be the second such connection (second point) to the gas system, e.g., beyond an upstream three-way connection, (gas) pressure gauge, oil flow meter, and fuel tank. The first three-way connection may be arranged in a direct pipeline downstream of the fuel tank, and optionally downstream of one or more further three-way connections.

The flow loop may comprise a second two-way valve fluidly connected to the first three-way connection, and may be connected to the first three-way connection (downstream thereof) via any of the aforementioned pipes, and may contain any of the intervening components described above. The flow loop may comprise a static mixer fluidly connected to the output branch of the first three-way connection through the second two-way valve, such as any described above.

The flow loop may comprise a test pump assembly fluidly connected to the static mixer. Like all the elements described above and below, the test pump assembly may be connected to the first three-way connection (downstream thereof) via any of the aforementioned pipes, and may contain any of the intervening components described above. The test pump assembly may include, for example, a path through test pump and a second path, branching off in parallel to the first path back upstream or the pump, then back into the first path downstream of the pump. The second path may contain one or more differential pressure gauges. Downstream of the mixer and upstream of the test pump assembly, a temperature gauge and/or pressure gauge may be connected into the piping, optionally arranged upon the same joint. A further pressure gauge may be included downstream of the test pump assembly, arranged and connected into the piping, optionally at or downstream of the rejoining point of the first and second paths (parallel flow portion).

The flow loop may comprise a third two-way valve, of any type described above, fluidly connected to the test pump assembly (downstream thereof and optionally further downstream of the second pressure gauge); and a fluid return fluidly connected to the third two-way valve (downstream thereof) and the fluid inlet (upstream thereof) of the liquid tank. Any number of components described herein may intervene between the third two-way valve and the fluid inlet, depending upon the application desired, though the third two-way valve and the fluid inlet may be directly connected in a hermetically sealed manner without intervening elements. The flow between the third two-way valve and the fluid inlet may preferably include a gas and a liquid as a multi-fluid flow.

The first two-way valve, second two-way valve, the input branches of the three-way connection, and the output branch of the first three-way connection may be capable of stopping a flow through the flow loop, in a manner that can be toggled between at least on and off, though optionally further in any fractional manner in between, e.g., at least 5, 10, 15, 20 25, 30, 35, 40, 45, or 50% flow and/or up to 95, 90, 85, 80, 75, 70, 65, 60, 55, or 50% flow.

The piping between the fluid tank and the first three-way connection may include a liquid-only pressure gauge arranged on piping at a point in the line between the fluid tank and the first three-way connection such that a liquid-only pressure is measured. The loop may be require a 100% liquid draw off of the fuel tank, i.e., from the fuel tank and/or without intervening feeds between the fuel tank and the liquid-only pressure gauge, such that the appropriate liquid pressure can be measured.

The static mixer may be configured to mix a liquid flow from the liquid tank with a gas flow from the gas system to produce the multiphase flow. The static mixture may be supplemented and/or supplanted by a dispersion mixer and/or a shear static mixer. The (static) mixer may be made from a stainless steel or other material or combination described above, and may have a diameter in a range of from, e.g., 10 to 1500 mm, such as at least 10, 15, 20, 25, 30, 40, 50, 60, 75, 85, or 100 mm and/or up to 150, 130, 120, 110, 100, 90, 80, 70, 60, 50, 40, 30, 25, 20, 15, 10, or 5 cm. The mixer may have the same average diameter as the general piping of the flow loop, e.g., 100±1, 2.5, 5, 7.5, 10, 25, 33 or 50% of the diameter (or any range including any of these endpoints).

The gas system may comprise a gas tank, fluidly connected to the first three-way connection, and a solenoid valve between the gas tank (downstream thereof) and the first three-way connection (upstream thereof). The gas system, may also comprise a further branch connecting to a three-way connection upstream of the first three-way connection on the flow loop. The gas system may connect fluidly to the flow loop at a first point, at a second three-way connection such as a three-way connection downstream of the flow meter, and a second point such as a three-way connection downstream of the flow meter and downstream of the first point. The first and second points may be fluidly separated on the flow loop by the first one-way valve and/or further components, or may be separated upon the flow loop by only the first one-way valve (of any type described herein). The gas system may connect fluidly to the flow loop at a first point, at a second three-way connection (either upstream or downstream of the first three-way connection), and a second point, joining at the first three-way connection.

The gas system may further comprise: a fourth two-way valve (of any type described herein) fluidly connected to the gas tank, which gas tank may be a flame-resistant tank and/or a pressure-resistant tank, e.g., for pressures of at least 5, 10, 25, 50, 100, or 150 bar and/or up to 1000, 750, 500, 400, 300, 250, 200, 150, 125, or 100 bar; a first pressure regulator (such as a single or double stage regulator) fluidly connected to the fourth two-way valve (downstream thereof); a gas flow meter—of any type described above for liquid flow meters applicable to condensed fluids—fluidly connected to the pressure regulator (downstream thereof); and a pressure gauge configured to measure a pressure in the gas system. Pressure gauges as described herein, except where explicitly specified may measure absolute pressure, gauge pressure, or differential pressure, and may employ analog and/or digital hydrostatic—e.g., piston, liquid column/manometer, McLeod gauge, etc.—technology, aneroid—e.g., Bourdon gauge, diaphragm, bellows, magnetic coupling, etc.—technology, spinning-rotor technology, electronic pressure—e.g., thermal conductivity, Pirani (one wire), two-wire, etc.—technology, and/or ionization gauge (hot cathode, cold cathode, etc.—technology.

The solenoid valve may be arranged between, and in fluid connection with, the gas flow meter (downstream thereof) and the first three-way connection (upstream thereof) of the flow loop. The pressure regulator may be configured to receive a signal from the first pressure gauge and the pressure gauge of the gas system, and optionally further a second gas system pressure gauge, a third gas system pressure gauge, and/or a fourth gas system pressure gauge, and to equalize a pressure in the gas system and the flow loop. Pressure gauges in the gas system may be, for example, arranged downstream of the pressure regulator and/or upstream of the solenoid valve, in a branch off of the pressure regulator that does not directly cross the gas flow meter, and/or downstream of the solenoid valve. The gas (e.g., air, $N_2$, $O_2$, $CO_2$, etc.) flow meter may be arrange downstream of the pressure regulator and upstream of a junction of a second path, running downstream of the pressure regulator to the junction, in parallel to the path running through the gas flow meter. At or downstream of the junction, a pressure gauge and/or a temperature gauge may be arranged, optionally on a common joint, such as the junction. The pressure regulator may, drawing upon signals from the pressure gauges in the flow loop and the gas system, operate the action of the solenoid valve. The gas system may comprise a second pressure gauge, downstream of the pressure regulator and upstream of the first and/or second (points) three-way connection, from which the pressure regulator is configured to receive a signal.

The flow loop and/or the gas system may be sealed off from the environment, such that no gases and/or liquids may enter the flow loop and/or the gas system (but for inevitable leaks or margins of error) in operation. That is, inventive arrangements may avoid open pools, flares, and/or vents. The gas system may include an isolated cylinder as a feed and/or may contain a gas compressor or feed from an outside source (with respect to the flow loop, fuel tank, and/or the gas system).

As described above, the first, second, and third two-way valves may independently be a gate valve, a globe valve, a ball valve, and/or a needle valve (or any further valve described above). The first, second, third, fourth, and any further two-way valves may be gate valves. The first, second, third, fourth, and any further two-way valves may be globe valves. The first, second, third, fourth, and any further two-way valves may be ball valves. Each of the two-way valves may be different from the others.

In the gas system, the pressure regulator may be configured to branch off the gas flow in a first direction and a second direction, which fluidly connect at separate points onto the flow loop and these directions may branch at the pressure regulator, downstream of the pressure regulator, or upstream of the pressure regulator. The first direction may connect fluidly to the flow loop at a first point, at a second three-way connection, and/or the second direction may connect fluidly to the flow loop at a second point. The pump testing apparatus, i.e., downstream of the mixer and/or upstream of the third two-way valve in the flow loop, may be configured to adjust and maintain a gas volume fraction in the multiphase flow.

Inventive systems may be suitable for the liquid comprising at least 50, 60, 70, 75, 80, 85, 90, 91, 92, 92.5, 93, 94, 95, 96, 97, 97.5, 98, 99, 99.1, 99.5, or 99.9 wt. % oil (or $N_2$, $CO_2$, $H_2$, ethylene, methane, propylene, CFC, tetrafluoroethylene, acetylene, petroleum gas, ethane, propane, butane, isobutylene, n-butene, methanol, and/or gasoline), based upon total liquid flow weight, and/or the gas comprising at least 50, 60, 70, 75, 80, 85, 90, 91, 92, 92.5, 93, 94, 95, 96, 97, 97.5, 98, 99, 99.1, 99.5, or 99.9 wt. % air (or $N_2$, $CO_2$, $H_2$, ethylene, methane, propylene, CFC, tetrafluoroethylene, acetylene, petroleum gas, ethane, propane, butane, isobutylene, n-butene, methanol, and/or gasoline), based upon total gas flow weight. Inventive systems may be suitable for the liquid being oil and/or the gas being air. Any component described above regarding the fuel tank and any related material or mixture having appropriate physical properties may be used in inventive systems.

Aspects of the invention provide methods of testing pump performance, which methods may comprise: pumping a multiphase flow through the pump in the flow loop of any permutation of the inventive system described herein; and measuring the properties of the pump, such as power consumption, shear, pressure loss, RPM, stress-strain and/or rheology of the fluid acted upon, etc., wherein the multiphase flow comprises a liquid (which may itself be a mixture of 2, 3, 4, 5, 6, 7, 8, 9, 10, or more compounds/materials) and a gas (which may itself be a mixture of 2, 3, 4, 5, 6, 7, 8, 9, 10, or more compounds/materials). Such methods may further comprise equalizing the pressure of the gas flow and the liquid flow within 95, 96, 97, 97.5, 98, 99, 99.1, 99.5, 99.9, 99.95, or 99.99% using the solenoid valve. Inventive methods may involve connecting a gas system including two lines connected at two separate points upon a flow loop, separated by a one-way valve, including sufficient valves and piping such that the pressure of the liquid entering the flow loop and the pressure of the gas entering the flow loop, both of which are combined in a multi-phase flow are within, e.g., 5, 4, 3, 2, 1, 0.5, 0.25, 0.1, 0.01, 0.001, or 0.0001% of each other, e.g., measured in bar. Inventive methods and/or systems may evaluate the gas volume fraction (GVF) in a range, e.g., of at least 1, 2.5, 5, 10, 15, 20, or 25 vol. % and/or up to 75, 67, 60, 55, 50, 45, 40, 35, 33, 30, 27.5, 25, 22.5, 20, 17.5, or 15 vol. %.

Inventive arrangements/systems may exclude or need not rely upon, for example, gamma-ray crude oil holdup analyzers, for the measurement of the gas mass fraction (GMF) of the multiphase flow. Inventive arrangements may have two connection lines from the gas source to the loop containing a mixer, mass flow meter, test pump assembly, differential pressure gauge, oil and/or gas pressure gauge(s), and/or temperature gauge(s). Such two (separate) gas line connections may be within a pipeline segment separable from other elements, e.g., along or within a mixed-flow loop, by two shut-off valves, such as a gate valves (or any suitable valve described herein). Such two (separate) gas line connections may be separated from each other, e.g., along or within a mixed-flow loop, by a one-way valve.

Aspects of the invention improve the operational performance of pumps, and evaluation thereof, when pumping liquids only or liquids with low gas volume fraction (GVF), i.e., two-phase or multi-phase flow. Aspects of the invention may be implemented in oil fields, particularly where wells produce mixtures of gas and oil in varying proportions. Aspects of the invention comprise the avoidance of slugging in the flow in pipelines upon increases in the gas volume fraction (GVF), thus limiting and/or preventing degradation of the performance of pump. Aspects of the invention include multiphase flow loop with avoid back-up and slugging by installing a solenoid valve on the gas stream, particularly upstream of the loop. The inventive implementation of one or more solenoid valves can maintain the same intake gas pressure as that of oil pressure during the experiments. Aspects of the invention comprise testing pumps at a more accurate or true gas volume fraction (GVF), thereby providing an improved picture of the actual performance of the pump. Aspects of the invention allow reduced, down to minimized, power consumption for a given pipeline and pump layout, and/or increased efficiency.

Aspects of the invention include installing solenoid valve, particularly in place of a needle valve, in a gas line of certain multiphase oil-gas flow loops, which may allow the loop to maintain substantially the same intake gas pressure as that of the oil pressure during the experiments. Aspects of the invention provide, particularly by virtue of the valve exchange, a more accurate ascertainment of the true performance of the pumps. Aspects of the invention include reducing power consumption and/or increased efficiency of pumps at any given gas volume fraction (GVF).

Aspects of the invention provide an improved loop capable of allowing more accurate gas volume fraction (GVF) measurement; reduced and/or minimum power consumption for a given pipe-pump arrangement; and/or increased efficiency in energy and/or pressure use.

EXAMPLES

Figure 2:
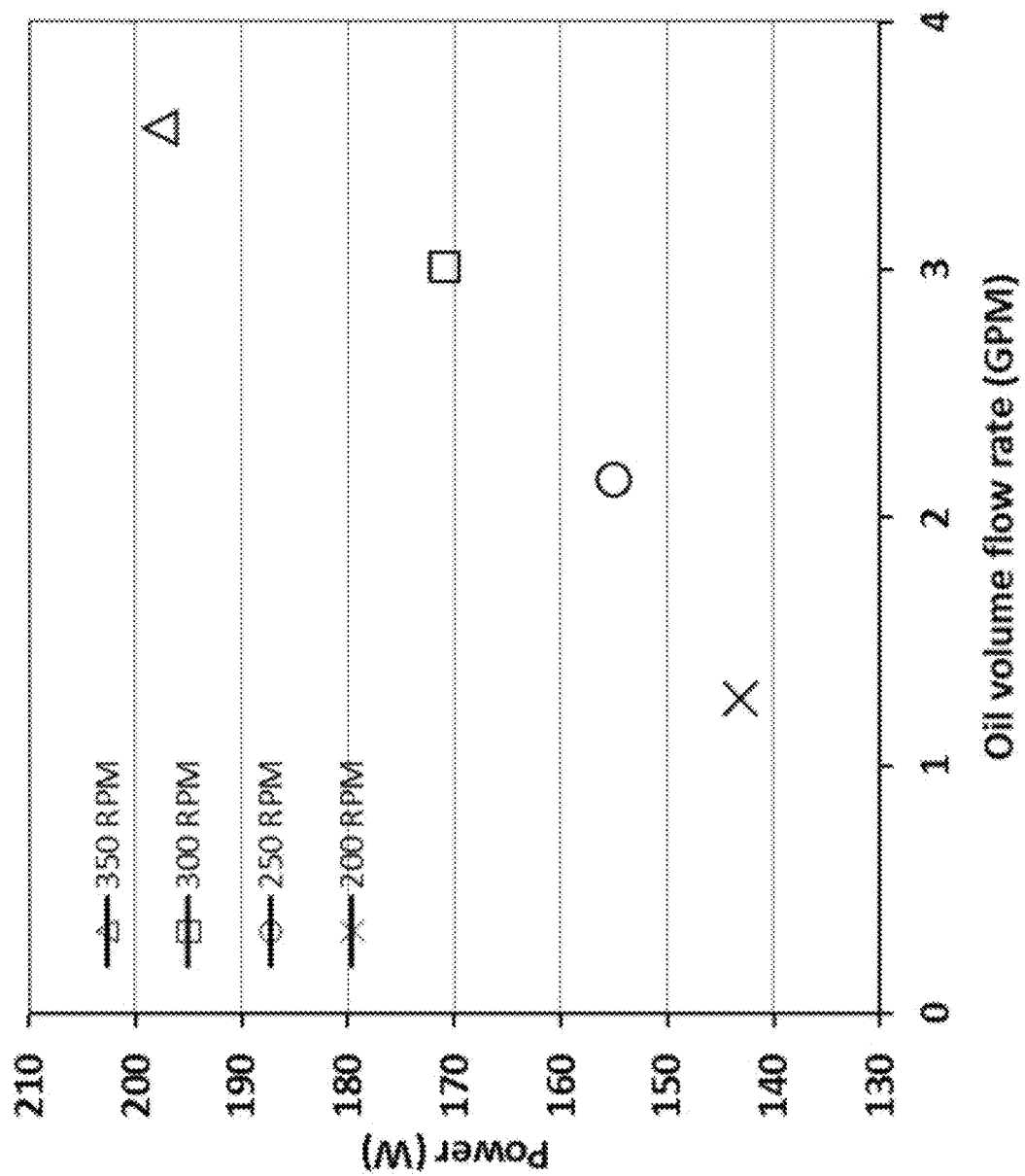
FIG. 2 shows a chart of the variation in power consumption for different RPMs in exemplary scenarios at 10% gas volume fraction (GVF)

Existing oil-gas multiphase flow loop: Experiments were conducted for 10 vol. % gas volume fraction (GVF) for varied rotations per minute (RPMs) engine speed, i.e., 200 to 350 RPM. Exxol D130 mineral oil was used to model the oil stream for the experiment. Compressed air was used to model the gas stream. As seen in FIG. 2, the power consumption increases with increases in engine RPM for a given, i.e., 10 vol. %, gas volume fraction (GVF).

Figure 3:
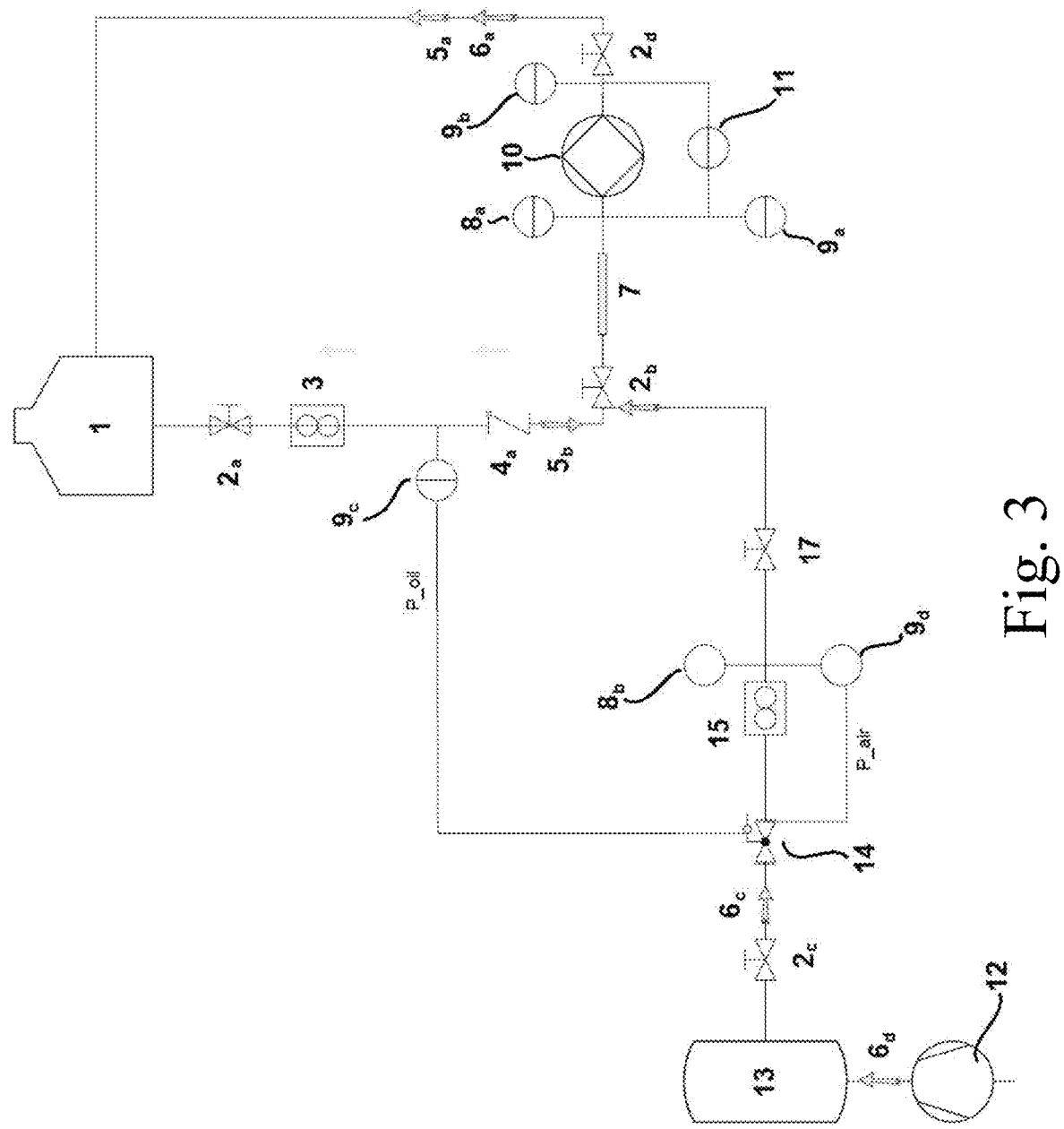
FIG. 3 shows an exemplary inventively modified oil-gas multiphase flow loop arrangement.

FIG. 3, discussed below, shows a modified oil-gas multiphase flow loop within the scope of the invention. Such an inventive oil-gas multiphase flow loop as shown in the exemplary lay-out, equipped with solenoid valve in place of a pin valve, may be used in pump performance testing to exploit more accurate values for the true gas volume fraction (GVF) for the pump performance evaluation. Such an improvement allows an improved, reduced, and/or minimized power consumption and/or increased efficiency.

Referring now to the drawings, wherein like reference numerals designate identical or corresponding parts throughout the several views.

FIG. 1 shows an exemplary existing oil-gas multiphase flow loop arrangement for achieving a desired gas volume fraction (GVF) in a typical schematic layout of a pump testing facility. The flow loop includes an oil tank (1), air tank (13), oil flow meter (3), air flow meter (15), valves ($2_a$, $2_b$, $2_c$, $2_d$, $4_a$, $4_b$, 16), air pressure regulator (14), differential pressure and line pressure gauges ($9_a$, $9_b$), etc. The test flow loop was fabricated using 1.0 inch pipe for oil and 0.50 inch pipe for air. The outlet pipeline from the test pump is connected back to the oil tank (1). One-way valves ($4_a$, $4_b$) were provided in oil and air pipelines to prevent flow of a given stream into the other stream's pipeline (to avoid mixing).

A needle valve (16) was installed on air pipeline to regulate air flow rate. Experiments were conducted for a given 10 vol. % gas volume fraction (GVF) at different rotational speeds, i.e., 200, 250, 300, and 350 rotations per minute (RPM). Oil flow to the pump (10) was by gravity. However, the oil flow to the inlet of the pump (10) depends on pump outlet conditions. The air flow rate was adjusted accordingly to achieve the above gas volume fraction (GVF). Exxol D130 mineral oil was used oil stream for the experiment.

Initially, the oil tank (1) was filled with Exxol D130 mineral oil and the air tank (13) was filled with air supplied by the compressor ($9_b$). For a given setting of the discharge valve ($2_d$), oil flows to the prototype pump (10) by gravity. The prototype pump (10) was powered on and its rotational speed was adjusted using a variable speed drive to achieve the desired speed. Air (6) was introduced into the loop from the high pressure air tank (13) via the air pipeline. The oil (5) and air (6) were supplied through their respective pipelines until the desired gas volume fraction (GVF) at the prototype pump inlet was attained. The gas volume fraction (GVF) was determined based on the corresponding readings of the oil flowmeter (3) and the air flowmeter (15). The air pressure and temperature were also monitored with the air flowmeter (15). The oil-air flow mixture went through a mixer (7) before it was routed to the pump inlet pipeline at a fixed controlled pressure. The experiments were conducted for different pump rotational speeds. Based on oil flow rate, the air flow rate was regulated using needle valve (16), to achieve 10 vol. % gas volume fraction (GVF). However, in order for the air to flow through the one-way check valve ($4_b$), the air stream pressure had to be higher than the oil pressure. Given the air stream to oil pressure difference in standard loops, the set gas volume fraction (GVF) is always higher or lower than the desired gas volume fraction (GVF). Because of this, the true performance of the pump cannot be assessed to an accuracy desired.

The experiments were conducted as described above for a 10 vol. % gas volume fraction (GVF). The reported parameters included: (1) oil and air volume flow rates; (2) fluid mixture pressure and temperature at the prototype pump inlet; (3) air pressure and temperature at the point of air flow rate measurement; (4) gas volume fraction; and (5) motor input power.

FIG. 2 shows a plot of the variation of the power consumption for different RPMs at a given gas volume fraction (GVF) of 10 vol. %. Therein it can be seen that at 200 RPM, a power of approximately 145 W is needed for a oil volume flow rate of approximately 1.25 gallons per minute (GPM), at 250 RPM, some 155 W are needed for ca. 2.2 GPM, at approx. 300 RPM, around 171 W are needed for about 3 GPM, and at 350 RPM, ca. 197.5 W are needed for 3.5 GPM.

FIG. 3 shows a modified mil-gas multiphase flow loop within the scope of the invention. The exemplary inventive modified oil-gas multiphase flow loop, including a solenoid valve, as shown in FIG. 3, illustrates air line pressure as "p_air" and oil line pressure as "p_oil." In general, the one-way value ($4_a$) operates when p_air is greater that p_oil. This can result in increased total pressure of the system, and can affect the true performance of the pump. By including the solenoid valve control system, the valve can operate at same p_air and p_oil pressures. Such a pressure equalization can help in assessing the performance of the pumps at true gas volume fractions (GVFs). More importantly, the inclusion of the solenoid valve control system can result in reduced (to minimum) power consumption and/or increased efficiency in the loop.

Numerous modifications and variations of the present invention are possible in light of the above teachings. It is therefore to be understood that within the scope of the appended claims, the invention may be practiced otherwise than as specifically described herein.

REFERENCE SIGNS 1 oil tank
2 gate valve
3 oil flow meter
4 one way valve 5 oil stream
6 air stream
7 static mixer
8 temperature gauge
9 pressure gauge
10 test pump assembly
11 differential pressure gauge
12 air compressor
13 air tank
14 pressure regulator
15 air flow meter
16 needle valve
17 solenoid valve

The invention claimed is:

1. A pump testing system, comprising:
 a flow loop comprising:
 a fluid tank comprising a liquid outlet and a fluid inlet;
 a first two-way valve fluidly connected to the liquid outlet;
 a liquid flow meter fluidly connected to the first two-way valve;
 a first one-way valve fluidly connected to the liquid flow meter;
 a first three-way connection comprising a first input branch fluidly connected to the first one-way valve, a second input branch fluidly connected to a gas system, and an output branch;
 a second two-way valve fluidly connected to the first three-way connection;
 a static mixer fluidly connected to the output branch of the first three-way connection through the second two-way valve;
 a test pump assembly fluidly connected to the static mixer;
 a third two-way valve fluidly connected to the test pump assembly; and
 a fluid return fluidly connected to the third two-way valve and the fluid inlet of the liquid tank,
 wherein the first two-way valve, second two-way valve, the input branches of the first three-way connection, and the output branch of the first three-way connection are capable of stopping a flow through the flow loop,
 wherein a liquid-only pressure gauge is arranged on piping at a point between the fluid tank and the first three-way connection such that a liquid-only pressure is measured,
 wherein the static mixer is configured to mix a liquid flow from the liquid tank with a gas flow from the gas system to produce a multiphase flow, and
 wherein the gas system comprises a gas tank, fluidly connected to the first three-way connection, and a solenoid valve between the gas tank and the first three-way connection.

2. The system of claim 1, wherein the gas system connects fluidly to the flow loop at a first point, at a second three-way connection, and a second point.

3. The system of claim 2, wherein the first and second points are fluidly separated on the flow loop by the first one-way valve.

4. The system of claim 1, wherein the gas system further comprises:
 a fourth two-way valve fluidly connected to the gas tank;
 a first pressure regulator fluidly connected to the fourth two-way valve;
 a gas flow meter fluidly connected to the pressure regulator; and
 a pressure gauge configured to measure a pressure in the gas system.

5. The system of claim 4, wherein the fourth two-way valve is a gate valve.

6. The system of claim 4, wherein the solenoid valve is arranged between, and in fluid connection with, the gas flow meter and the first three-way connection of the flow loop.

7. The system of claim 1, wherein the flow loop is sealed off from the environment.

8. The system of claim 1, wherein the gas system is sealed off from the environment.

9. The system of claim 1, wherein the first, second, and third two-way valves are independently a gate valve, a globe valve, a ball valve, and/or a needle valve.

10. The system of claim 1, wherein the first, second, and third two-way valves are gate valves.

11. The system of claim 1, wherein the liquid comprises at least 50 wt. % oil, based upon total liquid flow weight.

12. The system of claim 1, wherein the gas comprises at least 50 wt. % air, based upon total gas flow weight.

13. The system of claim 1, wherein the pump testing apparatus is configured to adjust and maintain a gas volume fraction in the multiphase flow.

* * * * *